United States Patent

[11] 3,597,835

[72] Inventors Claude Scaillet
 Uccle;
 Rene Romant, Saint-Servais, both of,
 Belgium
[21] Appl. No. 780,846
[22] Filed Dec. 3, 1968
[45] Patented Aug. 10, 1971
[73] Assignee Ateliers De Constructions Electriques De
 Charleroi (ACEC) Societe Anonyme
 Charleroi, Belgium
[32] Priority Dec. 20, 1967
[33] Belgium
[31] 52,362

[54] PROCESS FOR SECURING A STACK OF ROTOR LAMINATIONS ON THE SHAFT OF A SMALL MOTOR
 1 Claim, 1 Drawing Fig.
[52] U.S. Cl.................................................... 29/598,
  29/447, 29/520, 29/609, 310/42, 310/216
[51] Int. Cl........................................................ H02k 15/02
[50] Field of Search............................................. 29/596,
  598, 609, 520, 447; 310/216, 42

[56] References Cited
UNITED STATES PATENTS
| 1,158,463 | 11/1915 | Eaton | 29/598 |
| 1,291,388 | 1/1919 | Bright et al. | 29/447 UX |
| 1,762,017 | 6/1930 | Grenzer | 29/598 |
| 2,421,115 | 5/1947 | Carlson | 29/598 |

Primary Examiner—John F. Campbell
Assistant Examiner—Carl E. Hall
Attorney—Raymond A. Robic ABSTRACT: The disclosure relates to a process for securing a stack of rotor laminations on the shaft of a small motor. The binding of the laminations on the shaft is effected by inserting a shaft having a smooth surface into a stack of laminations, each lamination having a central bore and a dished portion around such bore, by applying to the stack of laminations in the region remote from the central bore a predetermined pressure, by heating at a predetermined temperature in a very short time interval the stack of laminations, and by applying a high pressure to the stack of laminations in the region of the central bore to compress the dished portion of the laminations and so produce a binding of the laminations on the shaft.

Patented Aug. 10, 1971
3,597,835
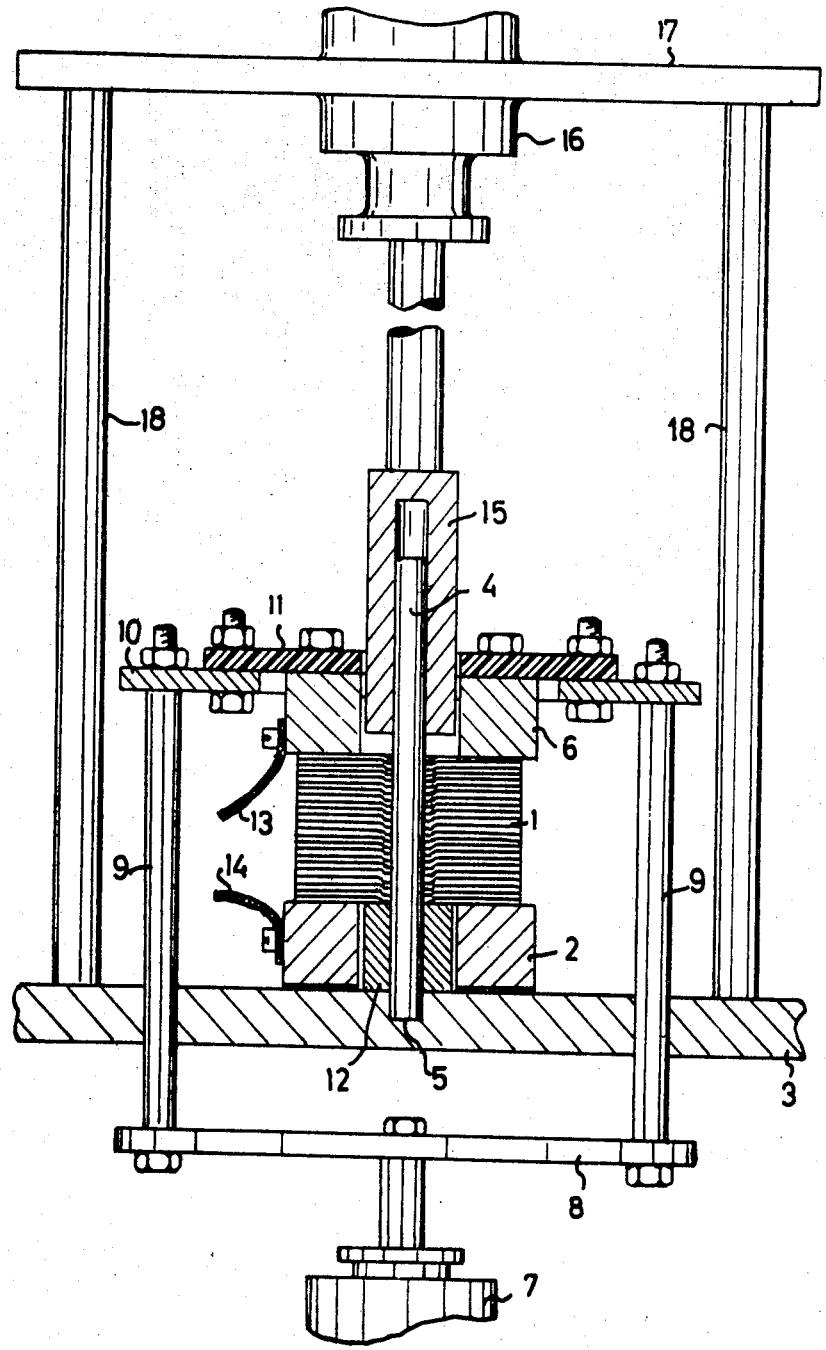
INVENTORS
Claude SCAILLET
René ROMANT
ATTORNEY

PROCESS FOR SECURING A STACK OF ROTOR LAMINATIONS ON THE SHAFT OF A SMALL MOTOR

This invention relates to a process for fixing a stack of rotor laminations on the shaft of a small motor.

Various methods are known to fix a stack of rotor laminations on the shaft of a small motor. They all have various advantages but none of them have no serious drawbacks. For example, the use of a toothed shaft ensures a very good binding of the laminations but requires a high pressure to insert the shaft through the stack of laminations which may result in the bending of the shaft. Furthermore, the end of the shaft supporting this pressure is distorted most of the time, which requires that any machining of the shaft such as threading be done only after the laminations have been secured to the shaft. Another process consists in using a shaft having a smooth surface and inserting it through a stack of laminations having a central bore and wherein the portion of each lamination around said bore is slightly dished, and in flattening the dished portion with a suitable tool. In this process, the above-mentioned drawbacks do not exist but the binding of the stack of laminations on the shaft is doubtful. Another process which consists in gluing the laminations to the shaft is very simple but the results are problematical. With regard to still another process which consists in heating the stack of laminations, it has the drawback that heat is transmitted to the shaft causing the expansion thereof which may result in the wedging of the shaft.

The present invention does not have the above-mentioned drawbacks and permits to obtain a perfect assembly whose binding is very regular. The shafts used in the application of the invention have a smooth surface and may be machined entirely ahead of time. The insertion of the shafts in the stack of laminations is done without any particular efforts and the following operations do not act upon the end of the shafts.

The process, in accordance with the invention, for securing a stack of rotor laminations on the shaft of a small motor comprises the steps of inserting a shaft having a smooth surface into a stack of laminations, each lamination having a central bore and being slightly dished around said central bore so as to form a protrusion with respect to the plane of the lamination and fitting over said shaft without binding; applying a suitable pressure to the stack of laminations in the region remote from the central bore; heating at a predetermined temperature in a very short time interval the stack of laminations; and applying a high pressure to the stack of laminations in the region of the central bore to compress the dished portion of each lamination and so produce a binding of said laminations on the shaft.

The following description and the attached drawing relates to an application of the process in accordance with the invention and to an embodiment of an apparatus for carrying out the process.

The drawing illustrates a stack 1 or rotor laminations, each having a central bore and being slightly dished around the central bore. The stack of laminations rests on a circular ring 2 secured to a fixed structure 3 but electrically insulated from such structure. A shaft 4 on which the stack of laminations 1 is to be secured is held in position at one of its extremities by means of a bore 5 in the structure 3, such bore being of suitable depth which may be varied at will. The central bores of the laminations have a diameter such that the shaft 4 may be inserted therein without any effort. On the top of the stack of laminations 1, is positioned an annular ring 6 similar to ring 2 and adapted to moved vertically under the action of an hydraulic or pneumatic cylinder 7. The mechanical link between the piston rod of cylinder 7 and ring 6 includes a plate 8, rods 9, a metallic ring 10, an insulating ring 11 and means for interconnecting such elements. In the drawing, the stack 1 is compressed between rings 2 and 6 by means of cylinder 7 which supplies a suitable pressure. Because of the shape of rings 2 and 6, the portion thereof in contact with the stack of laminations 1 does not interfere with the central dished portion of the laminations which portion is, underneath the stack of laminations, in contact with a piece of insulating material 12 capable of supporting high pressures. The rings 2 and 6 are made of conducting materials and constitute heating electrodes which are connected by means of cables 13 and 14 to a source of current which is not shown. A suitable current is applied to the electrodes to heat the stack of laminations 1, but only during a very short time interval so that the heat developed does not have time to heat the shaft. After the heating period is over, a high pressure is applied to the central portion of the laminations 1 by means of a device which will be disclosed later, in order to flatten the dished portion of each lamination around the central bore thereof and so cause binding of the laminations on shaft 4. The stack of laminations 1 being no longer heated, cools down and consequently contracts itself, causing an additional binding on the shaft. All the advantages resulting from the use of laminations having dished portions around the central bore thereof on a smooth shaft and resulting from heating such laminations are obtained without any of the disadvantages of such processes.

The device which compresses the central portion of the laminations comprises a hollow pusher 15 operated by the piston rod of an hydraulic or pneumatic cylinder 16 which is secured to fixed structure 3 by plate 17 and rods 18.

Because of the electric insulation of electrodes 2 and 6, the current fed to the electrodes through the conductors 13 and 14 flows through the thickness of the stack of the laminations without going through the shaft so that the heated portion is well determined and does not include the shaft. It is therefore seen that, during the complete operation, the ends of shaft 4 do not suffer any mechanical stresses and consequently may be threaded ahead of time or machined in any way.

It is to be understood that the apparatus for carrying out the invention may be realized in various other ways, the above apparatus having been disclosed by way of example only.

We claim:
1. Process for securing a stack of rotor laminations on the shaft of a small motor comprising the steps of:
   a. inserting a shaft having a smooth surface into a stack of laminations, each lamination having a central bore and being slightly dished around said bore so as to form a protrusion with respect to the plane of the lamination and fitting over said shaft without bending;
   b. applying a suitable pressure to the stack of laminations in the region remote from the central bore;
   c. heating at a predetermined temperature the stack of laminations under pressure, in a very short time interval in order to avoid the heating of the shaft; and
   d. applying immediately after heating a high pressure to the stack of laminations in the region of the central bore to compress the hot dished portion of each lamination so as to flatten it and insure contact of the central bore with the cold shaft.